United States Patent
Matsubara et al.

(10) Patent No.: US 9,091,471 B2
(45) Date of Patent: Jul. 28, 2015

(54) AIR CONDITIONING APPARATUS WITH TEMPERATURE RESPONSIVE CORRECTION OF UPPER LIMIT ROTATIONAL SPEED FOR A COMPRESSOR

(75) Inventors: Shinya Matsubara, Kariya (JP); Masanori Yasunaga, Toyota (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 1528 days.

(21) Appl. No.: 12/729,562

(22) Filed: Mar. 23, 2010

(65) Prior Publication Data

US 2010/0319375 A1 Dec. 23, 2010

(30) Foreign Application Priority Data

Jun. 17, 2009 (JP) ................................. 2009-144109

(51) Int. Cl.
*F25B 49/02* (2006.01)

(52) U.S. Cl.
CPC ............ *F25B 49/022* (2013.01); *F25B 2327/00* (2013.01); *F25B 2600/0253* (2013.01); *F25B 2700/2106* (2013.01); *F25B 2700/2115* (2013.01); *Y02B 30/741* (2013.01)

(58) Field of Classification Search
CPC ...... F25B 49/02; F25B 49/022; F25B 49/025; F25B 2327/00; F25B 2327/001; F25B 2600/0253
USPC .......... 62/228.1, 228.4, 229, 230, 324.1, 160, 62/324.6
See application file for complete search history.

(56) References Cited

U.S. PATENT DOCUMENTS

| | | | | |
|---|---|---|---|---|
| 3,871,188 A | * | 3/1975 | Vold et al. ........................ | 62/298 |
| 5,222,368 A | * | 6/1993 | Hanson ............................ | 62/126 |
| 6,044,651 A | * | 4/2000 | Reason et al. ................... | 62/161 |
| 6,543,242 B2 | * | 4/2003 | Reason et al. ............... | 62/228.4 |

FOREIGN PATENT DOCUMENTS

| | | |
|---|---|---|
| JP | 2002-340434 | 11/2002 |
| JP | 2007-92636 | 4/2007 |
| JP | 2008-202905 | 9/2008 |

OTHER PUBLICATIONS

KR 2008079079 (English abstract).*

* cited by examiner

*Primary Examiner* — Jonathan Bradford
(74) *Attorney, Agent, or Firm* — Oblon, McClelland, Maier & Neustadt, L.L.P.

(57) ABSTRACT

An air conditioning apparatus is provided. The apparatus includes: an engine; an outdoor unit including a compressor driven by the engine to inhale a refrigerant, and compress and discharge the inhaled refrigerant and an outdoor heat exchanger; an indoor unit including an indoor heat exchanger; a controlling unit which controls a rotational speed of the compressor to be lower than a predetermined upper limit rotational speed; an outdoor temperature detecting unit which detects an outdoor temperature; an in-box temperature detecting unit which detects an in-box temperature within an enclosure box which accommodates therein the engine and the compressor; a correcting unit which corrects an upper limit rotational speed of the compressor when the outdoor temperature exceeds a predetermined outdoor temperature; a canceling unit which cancels the correction of the upper limit rotational speed when the in-box temperature is lower than a predetermined in-box temperature.

9 Claims, 6 Drawing Sheets

AIR CONDITIONING APPARATUS WITH TEMPERATURE RESPONSIVE CORRECTION OF UPPER LIMIT ROTATIONAL SPEED FOR A COMPRESSOR

CROSS REFERENCE TO RELATED APPLICATIONS

This application is based on and claims priority under 35 U.S.C. §119 to Japanese Patent Application 2009-144109, filed on Jun. 17, 2009, the entire content of which is incorporated herein by reference.

TECHNICAL FIELD

The disclosure relates to an engine drive type air conditioning apparatus.

BACKGROUND DISCUSSION

JP2008-202905A describes an air conditioning apparatus. In the air conditioning apparatus, at the time of cooling operation, by limiting a rotational speed of a drive source (a rotational speed of a motor) for driving a compressor that compresses a refrigerant to an upper limit rotational speed, an abnormal overheating of a control circuit or the like and an overload operation of the compressor or the like is prevented. When the abnormal overheating of the control circuit or the like and the overload operation of the compressor or the like occur, the rotational speed of the motor differs depending on the outdoor temperatures. Thus, the air conditioning apparatus is provided with an outdoor temperature detecting means which detects the outdoor temperature at the time of cooling operation, and the upper limit rotational speed is changed and set based on the detection results thereof. Accordingly, unnecessary limitation of the rotational speed of the compressor (rotational speed of a motor) is avoided as much as possible to prevent the deterioration of the cooling performance, while preventing the abnormal overheating of the control circuit or the like and the overload operation of the compressor.

However, in the above-described air conditioning apparatus, an outdoor temperature, which is detected by an outdoor temperature sensor is affected by various thermal influences depending on an installation position thereof, and therefore, an accurate detection of the outdoor temperature may not be performed. For example, in a case where an outdoor unit with the outdoor temperature sensor provided therein includes an air-cooled heat exchanger (e.g., a radiator or the like), the outdoor unit is influenced by an air, the temperature of which has been increased after heat exchanging, so that the outdoor temperature sensor may detect a temperature higher than an actual outdoor temperature Additionally, due to influence of solar radiation, the outdoor temperature sensor or the surrounding components thereof are heated, and therefore, the outdoor temperature sensor may detect a temperature higher than the actual outdoor temperature.

However, in the above-described air conditioning apparatus, the upper limit rotational speed that limits the rotational speed of the compressor (rotational speed of the motor) is determined based on the outdoor temperature which is detected under such thermal influence. Therefore, the rotational speed of the compressor is limited superfluously, which may cause the deterioration of the cooling performance.

A need thus exists for an air conditioning apparatus which is not susceptible to the drawback mentioned above.

SUMMARY

According to an aspect of this disclosure, there is provided an air conditioning apparatus comprising: an engine; an outdoor unit including a compressor configured to be driven by the engine to inhale a refrigerant, and compress and discharge the inhaled refrigerant, an outdoor heat exchanger configured to serve as a condenser of the refrigerant at a time of cooling operation; an indoor unit including an indoor heat exchanger configured to serve as an evaporator of the refrigerant at the time of cooling operation; a refrigerant circuit forming a flow path for the refrigerant after discharged from the compressor and before inhaled to the compressor to circulate the refrigerant to the outdoor heat exchanger and the indoor heat exchanger; a controlling unit configured to control a rotational speed of the compressor to be lower than a predetermined upper limit rotational speed; an outdoor temperature detecting unit configured to detect an outdoor temperature; a correcting unit configured to correct an upper limit rotational speed of the compressor such that when the outdoor temperature detected by the outdoor temperature detecting unit exceeds a predetermined outdoor temperature at the time of cooling operation, the upper limit rotational speed becomes smaller from the predetermined upper limit rotational speed, as the outdoor temperature is higher; an in-box temperature detecting unit configured to detect an in-box temperature within an enclosure box which accommodates therein the engine and the compressor; and a canceling unit configured to cancel the correction of the upper limit rotational speed by the correcting unit when the in-box temperature detected by the in-box temperature detecting unit is lower than a predetermined in-box temperature.

According to another aspect of this disclosure, there is provided an air conditioning apparatus comprising: an engine; an outdoor unit including a compressor configured to be driven by the engine to inhale a refrigerant, and compress and discharge the inhaled refrigerant, and an outdoor heat exchanger configured to serve as a condenser of the refrigerant at a time of cooling operation; an indoor unit including an indoor heat exchanger configured to serve as an evaporator of the refrigerant at the time of cooling operation; a refrigerant circuit forming a flow path for the refrigerant after discharged from the compressor and before inhaled to the compressor to circulate the refrigerant to the outdoor heat exchanger and the indoor heat exchanger; an outdoor temperature detecting unit configured to detect an outdoor temperature; an in-box temperature detecting unit configured to detect an in-box temperature within a enclosure box which accommodates therein the engine and the compressor; and a controlling unit configured to perform a correction of reducing an upper limit rotational speed of the compressor when the outdoor temperature detected by the outdoor temperature detecting unit exceeds a predetermined outdoor temperature at a time of cooling operation, and configured to prohibit the correction when the in-box temperature detected by the in-box temperature detecting unit is lower than a predetermined in-box temperature.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An illustrative embodiment disclosed here will be explained with reference to the attached drawings.

Figure 1:
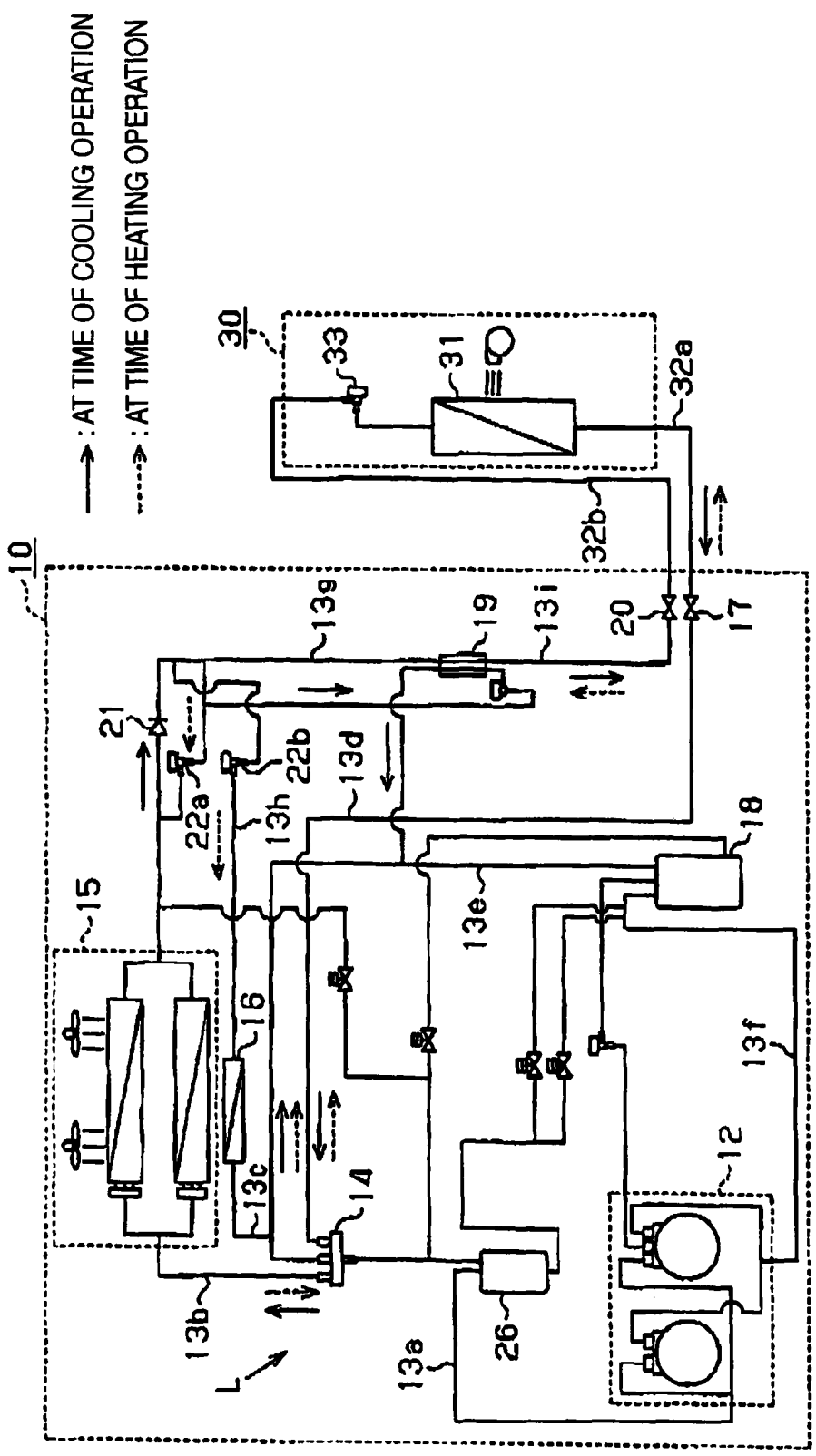
FIG. 1 is a circuit diagram that shows a refrigerant system according to an illustrative embodiment disclosed here.

FIG. 1 is a circuit diagram that shows an engine drive type air conditioning apparatus according to an illustrative embodiment. As shown in FIG. 1, the air conditioning apparatus includes an outdoor unit 10 and an indoor unit 30.

Figure 2:
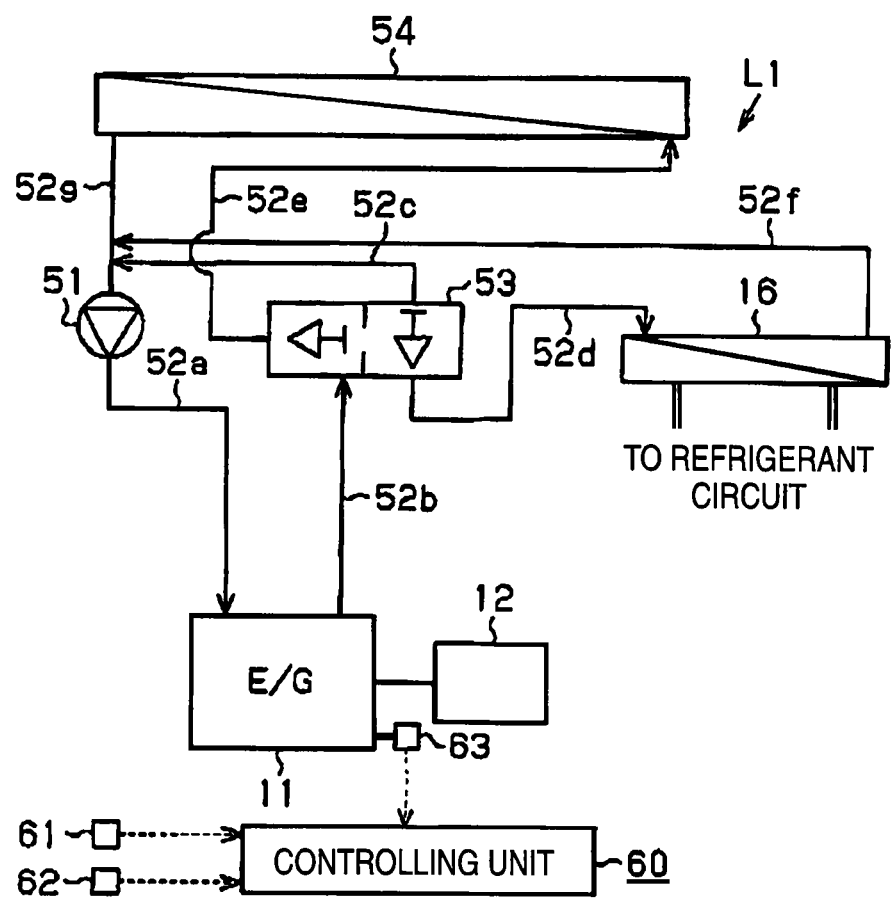
FIG. 2 is a circuit diagram that shows a system of a refrigerant according to the illustrative embodiment.

The outdoor unit 10 is installed with a compressor 12 which is driven by a gas engine 11 (see FIG. 2). The compressor 12 inhales the refrigerant and compresses the inhaled refrigerant, and transports the refrigerant to a four way valve 14 which is connected via a refrigerant piping 13a. The refrigerant piping 13a is provided with an oil separator 26.

The four way valve 14 is connected to an outdoor heat exchanger 15 via a refrigerant piping 13b, and is connected to a sub heat exchanger 16 via a refrigerant piping 13c, and further is connected an open/close valve 17 via a refrigerant piping 13d. Additionally, the four way valve 14 is connected to an accumulator 18 via a refrigerant piping 13e, and the accumulator 18 is connected to the compressor 12 via a refrigerant piping 13f.

The outdoor heat exchanger 15 serves as a condenser of the refrigerant at the time of cooling operation and serves as an evaporator of the refrigerant at the time of heating operation, and is connected to a supercooling heat exchanger 19 via a refrigerant piping 13g. In the refrigerant piping 13g, a check valve 21 is provided which allows the flow of the refrigerant toward the supercooling heat exchanger 19, and a flow rate regulating valve 22a is provided in parallel to the check valve 21. The sub heat exchanger 16 serves as the evaporator of the refrigerant at the time of heating operation and is connected to the supercooling heat exchanger 19 via a refrigerant piping 13h. A flow rate regulating valve 22b is provided in the refrigerant piping 13h. The supercooling heat exchanger 19 is connected to an open/close valve 20 via a refrigerant piping 13i.

The indoor unit heat exchanger 31 installed in the indoor unit 30 is connected to the open/close valve 17 via a refrigerant piping 32a and is connected to the open/close valve 20 via a refrigerant piping 32b. An electronic expansion valve 33 is provided in the refrigerant piping 32b. The indoor unit heat exchanger 31 serves as the evaporator of the refrigerant at the time of cooling operation and serves as the condenser of the refrigerant at the time of heating operation.

The refrigerant pipings 13a to 13i, 32a and 32b form flow paths for the refrigerant after discharged from the compressor 12 and before inhaled to the compressor 12, and configures a refrigerant circuit L that circulates the refrigerant to the outdoor unit heat exchanger 15 and the indoor unit heat exchanger 31. In particular, the substantially overall configuration relating to the refrigerant circulation of the outdoor unit 10 side except for the compressor 12 is generally known as a refrigerant unit RU (see FIG. 3).

Herein, the flow of the refrigerant will be described. In FIG. 1, the flows of the refrigerants at the time of cooling operation and at the time of heating operation are indicated by the solid line arrow and the dotted-line arrow, respectively.

At the time of cooling operation, the refrigerant discharged from the compressor 12 passes through the oil separator 26 and the four way valve 14 and then flows to the outdoor unit heat exchanger 15. Herein, the refrigerant loses heat, thereby being condensed and liquefied and entering a super cooled state by means of the supercooling heat exchanger 19. Thereafter, the refrigerant, which has been passed through the refrigerant piping 32b and decompressed with the electronic expansion valve 33 of the indoor unit 30, takes the indoor heat at the indoor unit heat exchanger 31 and evaporates. Then, the refrigerant passes through the refrigerant piping 32a and is returned to the compressor 12 via the four way valve 14 and the accumulator 18. By going through the above procedures, the inside is cooled.

On the other hand, at the time of heating operation, the refrigerant discharged from the compressor 12 passes through the oil separator 26 and the four way valve 14 and then flows to the indoor unit heat exchanger 31 (indoor unit 30). Herein, the refrigerant discharges the heat to the inside, thereby being condensed and liquefied. Thereafter, the refrigerant, which has been decompressed with the electronic expansion valve 33 of the inside unit 30, passes through the refrigerant piping 32b and is decompressed with the flow rate regulating valve 22a and 22b, respectively, of the outdoor unit 10, the refrigerant which has passed through the flow rate regulating valve 22a flows to the outdoor unit heat exchanger 15, and the refrigerant which has passed through the flow rate regulating valve 22b flows to the sub heat exchanger 16. The refrigerant absorbs the heat from the outdoor air and is evaporated in the outdoor unit heat exchanger 15, and absorbs the heat from the discharging heat of the engine and is evaporated in the sub heat exchanger 16. Then, the refrigerant, which has passed through the outdoor unit heat exchanger 15 and gone through the four way valve 14, and the refrigerant, which has passed through the sub heat exchanger 16, are joined and returned to the compressor 12 via the accumulator 18. By going through the above procedures, the inside is heated.

Next, the gas engine 11 of the outdoor unit 10 and the refrigerant system thereof will be described with reference to FIG. 2. As shown in FIG. 2, the flow of the refrigerant is created by means of a water pump 51 installed in the outer unit 10, and the refrigerant is transported to the gas engine 11 via a refrigerant piping 52a. The refrigerant is heated by the gas engine 11 in a flow path (not shown) within the gas engine 11, and is transported to a thermostat valve 53 via a liquid piping 52b.

The thermostat valve 53 is connected to the water pump 51 via a bypass liquid piping 52c and connected to the sub heat exchanger 16 via a liquid piping 52d. The thermostat valve 53 is connected to a radiator 54 via a liquid piping 52e. The radiator 54 radiates the refrigerant, which has been heated by the gas engine 11, by means of the heat exchange with the outdoor air. The sub heat exchanger 16 is connected to the water pump 51 via a liquid piping 52f, and the radiator 54 is connected to the water pump 51 via a liquid piping 52g. The thermostat valve 53 regulates the flow rate of the refrigerant flowing in the bypass liquid piping 52c, the sub heat exchanger 16 and the radiator 54, depending on the temperature of the refrigerant.

Specifically, when the temperature is low at the time of operation start or the like, the refrigerant heated with the gas engine 11 is returned to the water pump 51 via the thermostat valve 53 and is reheated with the gas engine 11. The refrigerant heated by the gas engine 11 flows to the sub heat exchanger 16 via the thermostat valve 53 when the temperature is increased. The refrigerant heated by the gas engine 11 flows to the radiator 54 via the thermostat valve 53 when the temperature is further increased.

The refrigerant, which has been led to the bypass liquid piping 52c by means of the thermostat valve 53, is smoothly heated by repeating the heat exchange with the gas engine 11. Furthermore, the refrigerant, which has been led to the sub heat exchanger 16 by means of the thermostat valve 53, is provided for the heat exchange with the refrigerant flowing in the sub heat exchanger 16, thereby heating the refrigerant. Accordingly, at the time of heating, the refrigerant is heated to improve the heating performance. The refrigerant, which has been led to the radiator 54 by the thermostat valve 53 is radiated through the heat exchange between the bypass liquid piping 52c and the outdoor air. The liquid pipings 52a to 52g form flow paths before the refrigerant transported by the water pump 51 is returned to the water pump 51, thereby configuring the refrigerant circuit L1 that circulates the refrigerant to the gas engine 11 or the like. In particular, the substantially overall configuration relating to the gas engine 11 and the refrigerant circulation thereof or the like is generally known as an engine unit EU (see FIG. 3).

Figure 3B:
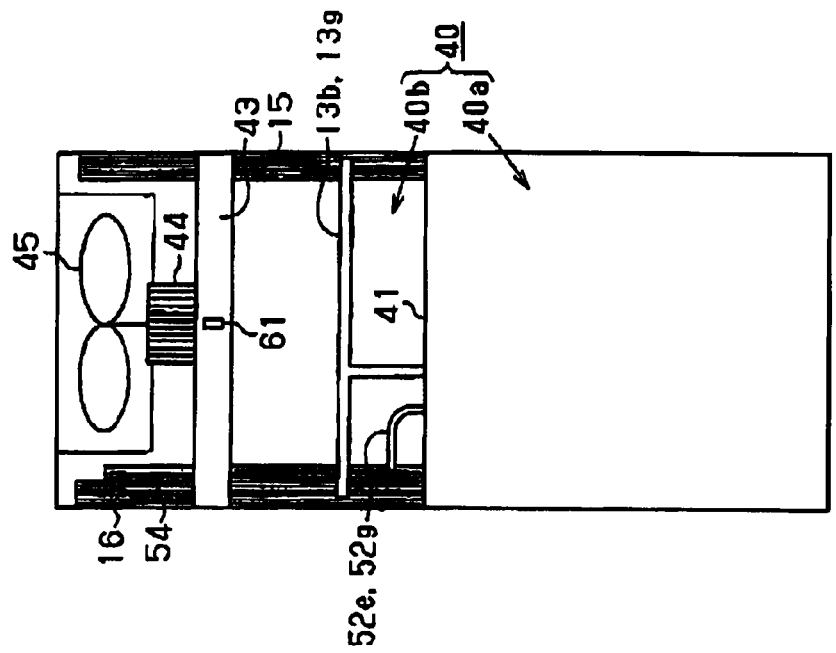
FIG. 3B is a side view that shows the inside configuration of the outdoor unit.
Figure 3A:
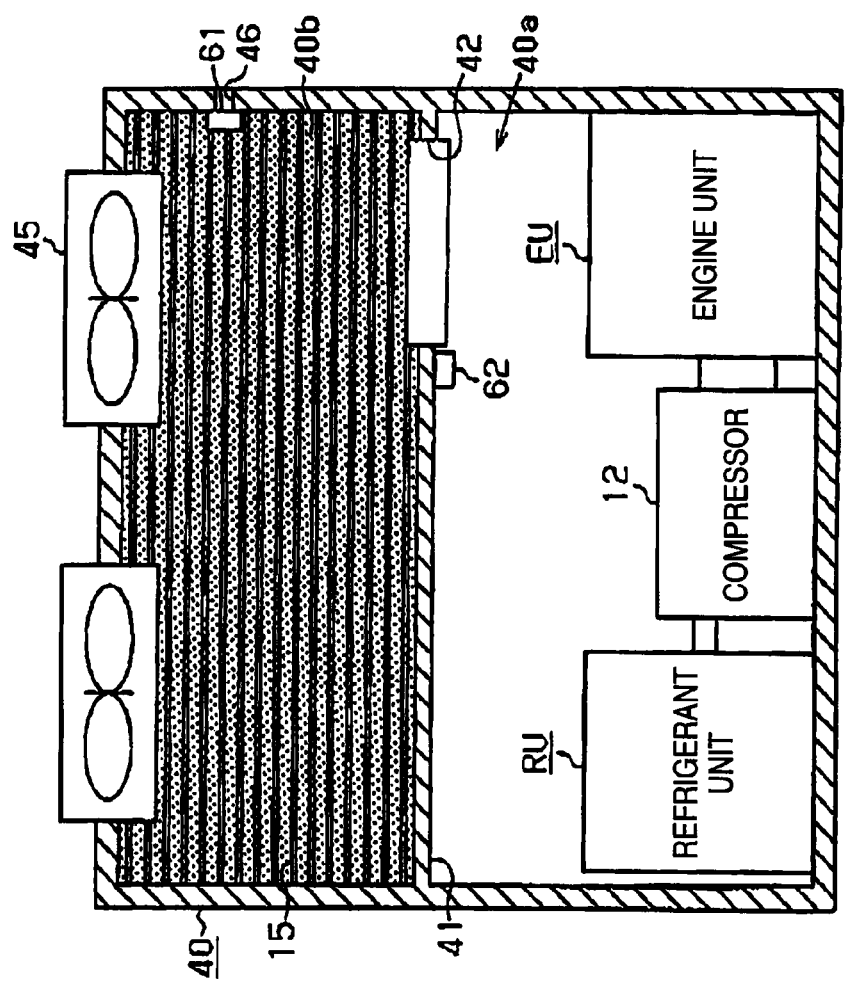
FIG. 3A is a front view that shows an inside configuration of an outdoor unit.

Next, an inside configuration of the outdoor unit 10 will be described. FIGS. 3A and 3B are a front view and a side view that show the inside configuration of the outdoor unit 10. As shown in FIGS. 3A and 3B, the outdoor unit 10 includes a box-shaped case 40 constituting a housing thereof. An inside of the case 40 is divided into an upper side and a lower side by a partition plate 41 which is provided in the middle portion in a vertical direction, and forms an enclosure box (engine room) 40a and a heat exchanging box (heat exchanger room) 40b in the lower side and the upper side of the partition plate 41, respectively.

In the enclosure box 40a, the compressor 12, the refrigerant unit RU and the engine unit EU are accommodated and installed. On the other hand, in the heat exchanger 40b, the outdoor heat exchanger 15 having cooling fins is provided to expand along the front surface and the rear surface thereof. The radiator 54 having cooling fins is provided adjacently to the outdoor heat exchanger 15 of the front side to be expand along the front surface thereof. The enclosure box 40a and the heat exchanging box 40b communicate with each other by means of a ventilation opening 42 which is provided in the partition plate 41 in the upper side of the engine unit EU.

The inside of the heat exchanging box 40b is further divided into two parts in the upper and lower side by means of a support column 43 provided in the middle portion in the vertical direction. In the upper part of the support column 43, there is provided a fan motor 44 and a fan 45 which is rotationally driven by the fan motor 44. The refrigerant transported to the radiator 54 is air cooled by means of the blowing air due to the fan 45.

In the support column 43 of the heat exchanging box 40b, an outdoor temperature sensor 61 (as an example of an outdoor temperature detecting means) is provided to oppose the ventilation opening 46 (FIG. 3A) formed on the case 40. The outdoor temperature sensor 61 detects an outdoor temperature To under the installation environment of the outdoor unit 10. On the lower surface opposing the enclosure box 40a of the partition plate 41, an in-box temperature sensor 62 (as an example of in-box temperature detecting means) is provided adjacent to the ventilation opening 42. The in-box temperature sensor 62 detects an in-box temperature Te (the temperature in the engine room) within the enclosure box 40a.

As described above, the ventilation opening 42 is provided in the upper side of the engine unit EU, and the in-box temperature sensor 62 is provided in the vicinity (a position which is closer to the engine unit EU than the compressor 12 or the like) of the engine unit EU. Therefore, an increase in the in-box temperature due to the heating of the gas engine 11 is more accurately detected. In addition, since the in-box temperature sensor 62 is provided in vicinity of the ventilation opening 42 in accordance with the arrangement of the ventilation opening 42, the in-box temperature is more accurately detected due to the convection air current within the enclosure box 40a.

As shown in FIG. 2, the outdoor unit 10 includes a controlling device 60 which is mainly configured by a microcomputer including a Central Processing Unit (CPU), for example. The controlling device 60 is electrically connected to the outdoor temperature sensor 61 and the in-box temperature sensor 62. Further, the controlling device 60 is electrically connected to a crank angle sensor 63. The controlling device 60 calculates the actually current rotational speed (y(s)) of the gas engine 11 from an output value of the crank angle sensor 63. The controlling device 60 controls the rotational speed of the gas engine 11 (compressor 12) based on the outdoor temperature To detected by the outdoor temperature sensor 61 and the in-box temperature Te detected by the in-box temperature sensor 62.

That is, at the time of cooling operation, the controlling device 60 controls the rotational speed so that the actual rotational speed (y(s)) of the gas engine 11 (compressor 12) is lower than the upper limit rotational speed Rmax such that the gas engine 11 and the compressor 12 are not driven in an overload manner.

Normally, the controlling device 60 maintains the upper limit rotational speed Rmax to be a predetermined upper limit rotational speed RM (e.g., 1950 [rpm]). The upper limit rotational speed RM is a standard (system) upper limit rotational speed which can, for example, prevent the abnormal overheating of the controlling device 60 or the like and the overload operation of the compressor 12 at the time of cooling operation. When the outdoor temperature To exceeds a predetermined outdoor temperature Tth1 (e.g., 47° C.), the controlling device 60 corrects the upper limit rotational speed Rmax to be smaller than the predetermined upper limit rotational speed RM (correction means). Specifically, the controlling device 60 corrects the upper limit rotational speed Rmax according to the following formula (1) stored in a built-in memory thereof in advance.

$$R\max = -600/5 \times (To-52) + 1350 \tag{1}$$

Figure 4:
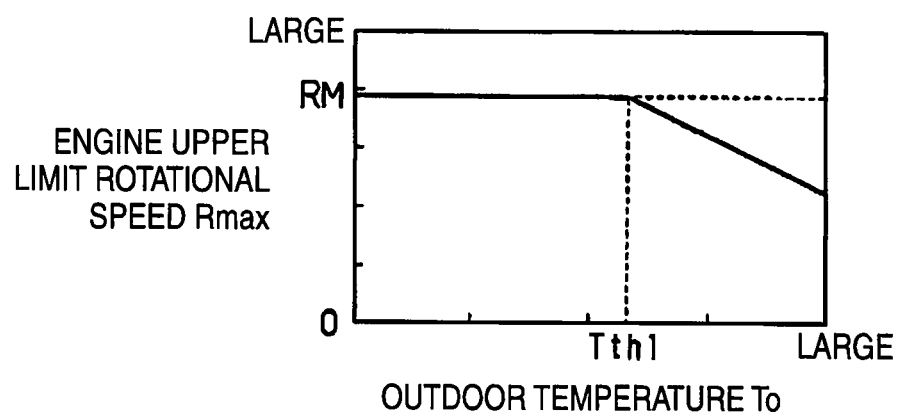
FIG. 4 is a map that shows a relationship of an outdoor temperature and an upper limit rotational speed.

FIG. 4 is a graph that shows the variation of the upper limit rotational speed Rmax according to the outdoor temperature To based on the above control.

At the time of cooling operation, when the in-box temperature Te is lower than a predetermined in-box temperature Tth2 (e.g., 67° C.), the controlling device 60 cancels the correction of the upper limit rotational speed Rmax based on the formula (1) (canceling means). In other words, although the outdoor temperature To exceeds the predetermined outdoor temperature Tth1, when the in-box temperature Te is lower than a predetermined in-box temperature Tth2 (e.g., 67° C.), the controlling device 60 maintains the upper limit rotational speed Rmax to be the predetermined upper limit rotational speed RM. Accordingly, by using the in-box temperature Te which is determined from the load of the system, as the determination criteria of the correction of the upper limit rotational speed Rmax, when there is a difference between the outdoor temperature To and the actual outdoor temperature, it is possible to reduce or prevent the unnecessary rotational speed limitation in the gas engine 11 (compressor 12) with respect to the maximum load of the system. It is noted that the predetermined in-box temperature Tth2 is determined from the heat-resisting property (performance maintenance) or the like of each component in the enclosure box 40a, and corresponds to the in-box temperature Te when at the time of cooling operation, the outdoor temperature To, which is not influenced by the heat depending on the installation position, is at the predetermined outdoor temperature Tth1.

Further, the controlling device 60 controls the rotational speed of the gas engine 11 such that the rotational speed (y(s)) of the gas engine 11 is lower than the upper limit rotational speed Rmax which is set in the above-described illustrative embodiment. Specifically, the controlling device 60 reads an engine rotational speed target value r(s), which is the upper limit rotational speed Rmax as a target value, and the actual rotational speed y(s) from the built-in memory thereof to compute the difference e(s) (=r(s)−y(s)) and calculates an opening degree controlling amount u(s) of the throttle valve by means of a computing method of a PID control based on the difference e(s). The throttle valve adjusts the flow rate of the mixed air to be introduced into a cylinder (combustion chamber) of the gas engine 11 by changing the opening degree. By applying the opening degree controlling amount u(s) in the gas engine 11, the rotational speed y(s) of the gas engine 11 is controlled based on the engine rotational speed target value r(s).

Next, the operation of the illustrative embodiment will be generally described with reference to the flowcharts of FIGS. 5 and 6.

Figure 5:
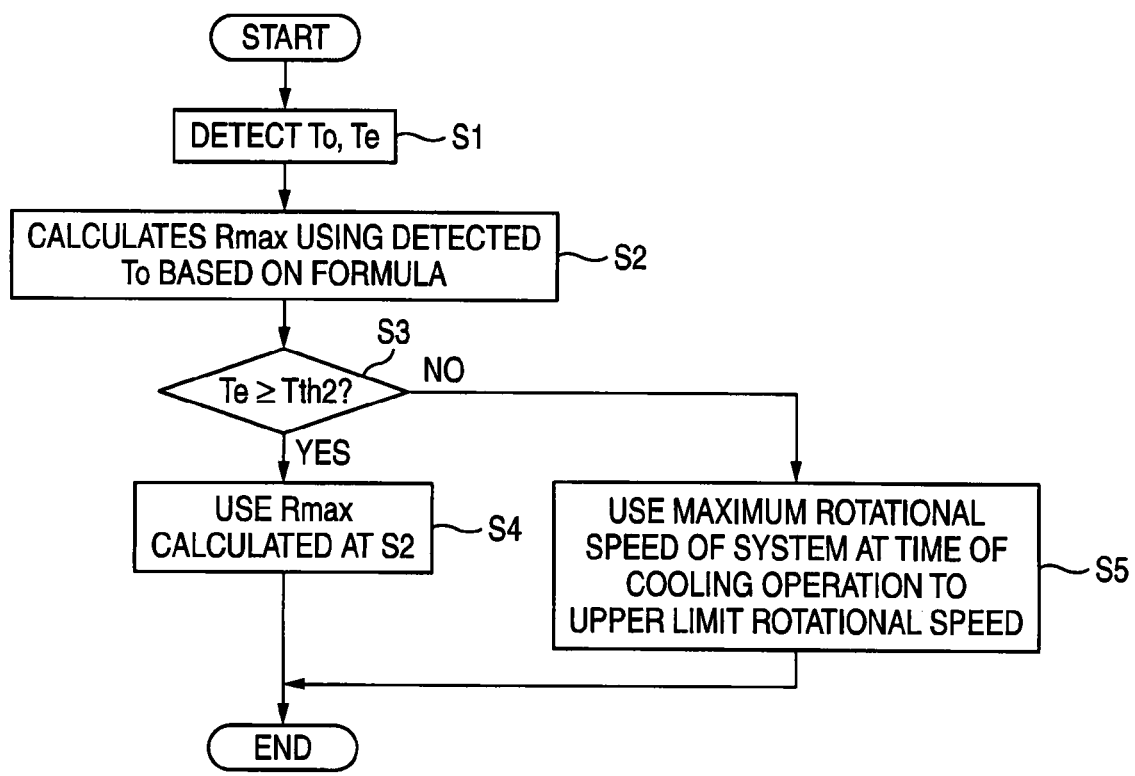
FIG. 5 is a flow chart that shows a setting process of the upper limit rotational speed according to the illustrative embodiment.

FIG. 5 is a flowchart that shows a setting process of the upper limit rotational speed Rmax by the controlling device 60. The setting process is repeatedly performed by means of, for example, regular time interruption. As shown in FIG. 5, once the control process proceeds to this process, the current outdoor temperature To and the current in-box temperature Te are detected (S1). Then, the upper limit rotational speed Rmax is calculated according to the formula (1) based on the detected outdoor temperature To (S2).

Next, it is determined whether the in-box temperature Te is equal to or larger than the predetermined in-box temperature Tth2 (S3). When the in-box temperature Te is equal to or larger than the predetermined in-box temperature Tth2, since the outdoor temperature To is estimated to be actually high, the upper limit rotational speed Rmax calculated in the S2 is to be used and stored in the memory (S4). When the in-box temperature Te is less than the predetermined in-box temperature Tth2, since the high outdoor temperature To is estimated to be influenced by the heat depending on the installation position, the maximum rotational speed of the system at the time of cooling operation, i.e., the upper limit rotational speed RM is to be used and stored in the memory as the upper limit rotational speed Rmax (S5). When the upper limit rotational speed Rmax is set in S4 or S5, the subsequent control process is terminated temporarily.

Figure 6:
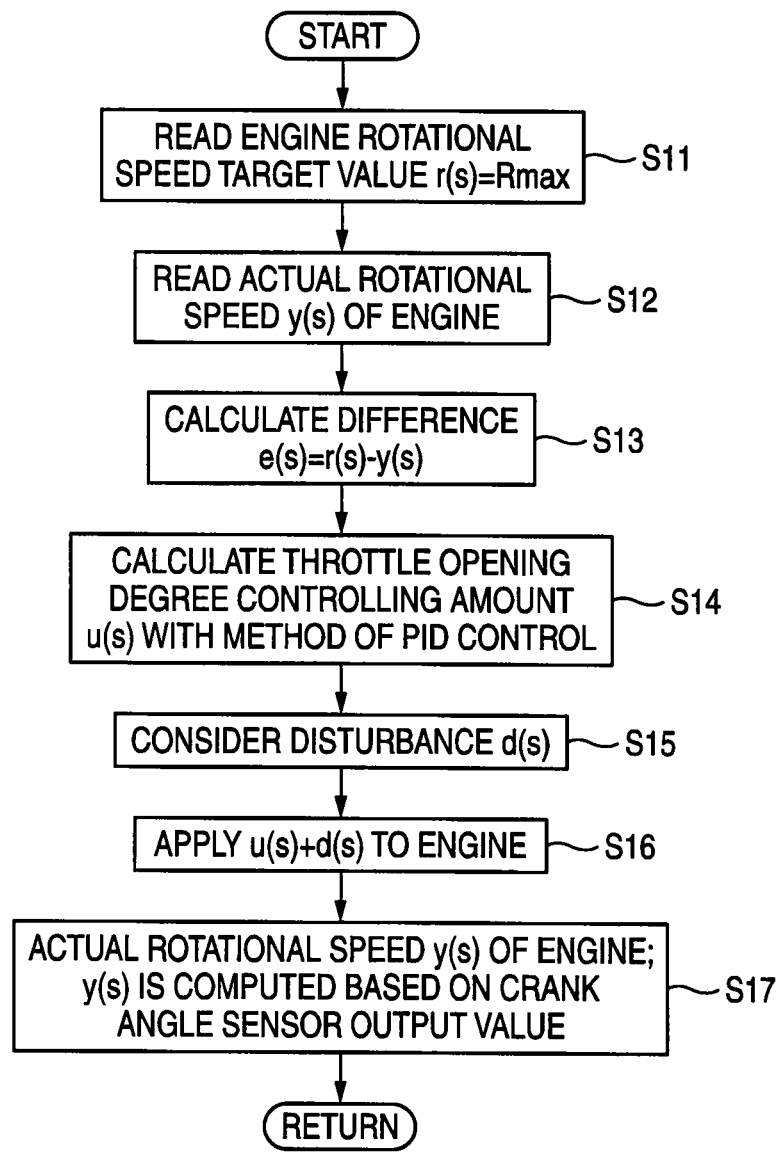
FIG. 6 is a flow chart that shows a controlling process of the rotational speed of an engine according to the illustrative embodiment.

FIG. 6 is a flowchart that shows the rotation controlling process of the gas engine 11 by the controlling device 60 based on the upper limit rotational speed Rmax. As shown in FIG. 6, when the control process proceeds to this process, as the engine rotational speed target value r(s), the current upper limit rotational speed Rmax (the upper limit rotational speed Rmax which is set in S4 or S5) is read (S11). Next, the current rotational speed y(s) of the gas engine 11 is read (S12). Then, the difference e(s) (=r(s)−y(s)) in the engine rotational speed target value r(s) and the actual rotational speed y(s) is calculated (S13). The opening degree controlling amount u(s) of the throttle valve is calculated by means of the calculating method of the PID control based on the difference e(s) (S14).

In addition, a disturbance d(s) is considered (S15), and the total value (=u(s)+d(s)) of the opening controlling amount u(s) and the disturbance d(s) is applied to the gas engine 11 (S16). While the opening degree controlling amount u(s) considering the disturbances d(s) is used, the driving of the gas engine 11 is controlled such that the rotational speed thereof y(s) is lower than the engine rotational speed target value r(s). Next, the current rotational speed y(s) of the engine 11 is calculated again from the output value of the crank angle sensor 63 (S17), and is stored in the memory and the subsequent control process is terminated temporarily. The rotational speed y(s) calculated herein is read in S12, and is provided for the driving control of the engine 11 in the next process.

As described above, according to the illustrative embodiment, the following effects can be obtained.

(1) In the above-described illustrative embodiment, when the in-box temperature Te detected by the in-box temperature sensor 62 is lower than the predetermined in-box temperature Tth2, the correction of the upper limit rotational speed Rmax is cancelled by the controlling device 60. Thus, even when the outdoor temperature To detected by the outdoor temperature sensor 61 is higher than the actual outdoor temperature, it is possible to suppress the deterioration of the cooling performance due to the over limitation of the rotational speed of the gas engine 11, i.e., the rotational speed of the compressor 12.

(2) In the above-described illustrative embodiment, the in-box temperature sensor 62 is provided at a position closer to the gas engine 11 (engine unit EU) than the compressor 12, which makes it possible to more accurately detect the rise in the in-box temperature Te due to the heating of the gas engine 11.

(3) In the above-described illustrative embodiment, the in-box temperature sensor 62 is provided in accordance with the arrangement of the ventilation opening 42, which makes it possible to more accurately detect the in-box temperature Te due to the convection air current in the enclosure box 40a.

(4) In the above-described illustrative embodiment, when the in-box temperature Te detected by the in-box temperature sensor 62 exceeds the predetermined in-box temperature Tth2, the upper limit rotational speed Rmax is corrected so as to be reduced by the controlling device 60, whereby the load is reduced. Therefore, it is possible to suppress the over increase of the in-box temperature (Te) to prevent the deterioration of various components due to an increase in the thermal load thereon.

The above-described illustrative embodiment may be modified as follows.

In the above-described illustrative embodiment, the outdoor temperature sensor 61 may be provided in the vicinity of the outdoor heat exchanger 15.

In the above-described illustrative embodiment, although the rotational speed of the compressor 12 is indirectly controlled via the rotational speed of the gas engine 11, the rotational speed of the compressor 12 may be directly controlled.

In the above-described illustrative embodiment, the calculation formula (1) of the upper limit rotational speed Rmax is an example.

The present invention may be applied to a kerosene heat pump (KHP) type air conditioning apparatus in which the compressor 12 is rotationally driven a kerosene engine.

It is provided illustrative, non-limiting embodiments as follows:

An air conditioning apparatus comprises: an engine; an outdoor unit including a compressor configured to be driven by the engine to inhale a refrigerant, and compress and discharge the inhaled refrigerant, and an outdoor heat exchanger configured to serve as a condenser of the refrigerant at a time of cooling operation; an indoor unit including an indoor heat exchanger configured to serve as an evaporator of the refrigerant at the time of cooling operation; a refrigerant circuit forming a flow path for the refrigerant after discharged from the compressor and before inhaled to the compressor to circulate the refrigerant to the outdoor heat exchanger and the indoor heat exchanger; a controlling unit configured to control a rotational speed of the compressor to be lower than a predetermined upper limit rotational speed; an outdoor temperature detecting unit configured to detect an outdoor temperature; a correcting unit configured to correct an upper limit rotational speed of the compressor such that when the outdoor temperature detected by the outdoor temperature detecting unit exceeds a predetermined outdoor temperature at the time of cooling operation, the upper limit rotational speed becomes smaller from the predetermined upper limit rotational speed, as the outdoor temperature is higher; an in-box temperature detecting unit configured to detect an in-box temperature within an enclosure box which accommodates therein the engine and the compressor; and a canceling unit configured to cancel the correction of the upper limit rotational speed by the correcting unit when the in-box temperature detected by the in-box temperature detecting unit is lower than a predetermined in-box temperature.

Even when the outdoor temperature detected by the outdoor temperature detecting unit is relatively high, if the in-box temperature detected by the in-box temperature detecting unit is lower than a predetermined in-box temperature, the outdoor temperature may be subject to various thermal influences, and therefore, an outdoor temperature higher than an actual outdoor temperature may be detected. According to the above configuration, if the in-box temperature detected by the in-box temperature detecting unit is lower than the predetermined in-box temperature, a correction of the upper limit rotational speed by the correction unit is canceled by the cancellation unit. Thus, even when the outdoor temperature detected by the outdoor temperature detecting unit is detected to be higher than the actual outdoor temperature, it is possible to suppress the deterioration of the cooling performance due to the over limitation of the rotational speed of the compressor.

In the above air conditioning apparatus, the in-box temperature detecting unit may be provided at a position closer to the engine than the compressor.

According to this configuration, the in-box temperature detecting unit is provided at a position closer to the engine than the compressor, which makes it possible to more accurately detect a rise in the in-box temperature due to the heating of the engine.

In the above air conditioning apparatus, the in-box temperature detecting unit may be provided in accordance with an arrangement of a ventilation opening which communicates between the enclosure box and a heat exchanging box provided in an upper part of the enclosure box.

According to this configuration, the in-box temperature detecting unit is provided in accordance with an arrangement of a ventilation opening, which makes it possible to more accurately detect the in-box temperature by the use of the convection air current within the enclosure box.

In the above air conditioning apparatus, the in-box temperature detecting unit may be exposed to a convection air current within the enclosure box, which occurs due to heating of the engine.

In the above air conditioning apparatus, the controlling unit, the correcting unit and the canceling unit may use a single CPU.

An air conditioning apparatus comprises: an engine; an outdoor unit including a compressor configured to be driven by the engine to inhale a refrigerant, and compress and discharge the inhaled refrigerant, and an outdoor heat exchanger configured to serve as a condenser of the refrigerant at a time of cooling operation; an indoor unit including an indoor heat exchanger configured to serve as an evaporator of the refrigerant at the time of cooling operation; a refrigerant circuit forming a flow path for the refrigerant after discharged from the compressor and before inhaled to the compressor to circulate the refrigerant to the outdoor heat exchanger and the indoor heat exchanger; an outdoor temperature detecting unit configured to detect an outdoor temperature; an in-box temperature detecting unit configured to detect an in-box temperature within a enclosure box which accommodates therein the engine and the compressor; and a controlling unit configured to perform a correction of reducing an upper limit rotational speed of the compressor when the outdoor temperature detected by the outdoor temperature detecting unit exceeds a predetermined outdoor temperature at a time of cooling operation, and configured to prohibit the correction when the in-box temperature detected by the in-box temperature detecting unit is lower than a predetermined in-box temperature.

In the above configuration, it is possible to provide the air compressor which can suppress the deterioration of the cooling performance due to the over limitation of the rotational speed of the compressor.

The principles, preferred embodiment and mode of operation of the present invention have been described in the foregoing specification. However, the invention which is intended to be protected is not be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within spirit and scope of the present invention as defined in the claims, be embraced thereby.

What is claimed is:

1. An air conditioning apparatus comprising:
   an engine;
   an outdoor unit including:
   a compressor configured to be driven by the engine to receive a refrigerant, and compress and discharge the received refrigerant; and
   an outdoor heat exchanger configured to serve as a condenser of the refrigerant at a time of cooling operation;
   an indoor unit including an indoor heat exchanger configured to serve as an evaporator of the refrigerant at the time of cooling operation;
   a refrigerant circuit forming a flow path for the refrigerant after being discharged from the compressor and before being received by the compressor to circulate the refrigerant to the outdoor heat exchanger and the indoor heat exchanger;
   a controlling unit configured to control a rotational speed of the compressor to be lower than a predetermined upper limit rotational speed;

an outdoor temperature detecting unit configured to detect an outdoor temperature;

a correcting unit configured to correct an upper limit rotational speed of the compressor such that when the outdoor temperature detected by the outdoor temperature detecting unit exceeds a predetermined outdoor temperature at the time of cooling operation, the upper limit rotational speed becomes smaller from the predetermined upper limit rotational speed, as the outdoor temperature is higher;

an in-box temperature detecting unit configured to detect an in-box temperature within an enclosure box which accommodates therein the engine and the compressor; and a canceling unit configured to cancel the correction of the upper limit rotational speed by the correcting unit when the in-box temperature detected by the in-box temperature detecting unit is lower than a predetermined in-box temperature.

2. The air conditioning apparatus according to claim 1, wherein the in-box temperature detecting unit is provided at a position closer to the engine than the compressor.

3. The air conditioning apparatus according to claim 1, wherein the in-box temperature detecting unit is provided in accordance with an arrangement of a ventilation opening which communicates between the enclosure box and a heat exchanging box provided in an upper part of the enclosure box.

4. The air conditioning apparatus according to claim 1, wherein the in-box temperature detecting unit is exposed to a convection air current within the enclosure box, which occurs due to heating of the engine.

5. The air conditioning apparatus according to claim 1, wherein the controlling unit, the correcting unit and the canceling unit use a single CPU.

6. An air conditioning apparatus comprising:
an engine;
an outdoor unit including:
a compressor configured to be driven by the engine to receive a refrigerant, and compress and discharge the received refrigerant; and an outdoor heat exchanger configured to serve as a condenser of the refrigerant at a time of cooling operation;

an indoor unit including an indoor heat exchanger configured to serve as an evaporator of the refrigerant at the time of cooling operation;

a refrigerant circuit forming a flow path for the refrigerant after being discharged from the compressor and before being received by the compressor to circulate the refrigerant to the outdoor heat exchanger and the indoor heat exchanger;

an outdoor temperature detecting unit configured to detect an outdoor temperature;

an in-box temperature detecting unit configured to detect an in-box temperature within an enclosure box which accommodates therein the engine and the compressor; and a controlling unit configured to perform a correction of reducing an upper limit rotational speed of the compressor when the outdoor temperature detected by the outdoor temperature detecting unit exceeds a predetermined outdoor temperature at a time of cooling operation, and configured to prohibit the correction when the in-box temperature detected by the in-box temperature detecting unit is lower than a predetermined in-box temperature.

7. The air conditioning apparatus according to claim 6, wherein the in-box temperature detecting unit is provided at a position closer to the engine than the compressor.

8. The air conditioning apparatus according to claim 6, wherein the in-box temperature detecting unit is provided in accordance with an arrangement of a ventilation opening which communicates between the enclosure box and a heat exchanging box provided in an upper part of the enclosure box.

9. The air conditioning apparatus according to claim 6, wherein the in-box temperature detecting unit is exposed to a convection air current within the enclosure box, which occurs due to heating of the engine.

* * * * *